United States Patent
Yamamoto et al.

(10) Patent No.: US 11,558,518 B2
(45) Date of Patent: Jan. 17, 2023

(54) IMAGE READING APPARATUS AND IMAGE FORMING APPARATUS

(71) Applicant: CANON KABUSHIKI KAISHA, Tokyo (JP)

(72) Inventors: Yuichi Yamamoto, Ibaraki (JP); Takayuki Fukushima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 17/328,876

(22) Filed: May 24, 2021

(65) Prior Publication Data

US 2021/0377409 A1    Dec. 2, 2021

(30) Foreign Application Priority Data

Jun. 1, 2020   (JP) .............................. JP2020-095457

(51) Int. Cl.

| | |
|---|---|
| *B65H 1/04* | (2006.01) |
| *B65H 1/14* | (2006.01) |
| *B65H 43/02* | (2006.01) |
| *H04N 1/00* | (2006.01) |
| *B65H 43/04* | (2006.01) |
| *B65H 31/36* | (2006.01) |
| *B65H 31/02* | (2006.01) |

(52) U.S. Cl.
CPC ......... *H04N 1/00631* (2013.01); *B65H 31/02* (2013.01); *B65H 31/36* (2013.01); *B65H 43/04* (2013.01); *B65H 2404/73* (2013.01); *B65H 2405/1117* (2013.01)

(58) Field of Classification Search
CPC .. B65H 2405/11171; B65H 2405/1115; B65H 2405/1117; B65H 2511/515; B65H 2511/51; B65H 1/04; B65H 1/14; B65H 7/04; B65H 9/04; B65H 9/20; B65H 43/02; B65H 43/04; B65H 43/08; B65H 2404/73; H04N 1/00631
See application file for complete search history.

(56) References Cited

U.S. PATENT DOCUMENTS

| | | | |
|---|---|---|---|
| 7,686,294 B2 | 3/2010 | Moore | |
| 2007/0020007 A1* | 1/2007 | Azuma | G03G 15/607 |
| | | | 399/367 |

FOREIGN PATENT DOCUMENTS

| | | | |
|---|---|---|---|
| JP | H0772685 A | | 3/1995 |
| JP | 2000194234 A | * | 7/2000 |

(Continued)

*Primary Examiner* — Luis A Gonzalez
(74) *Attorney, Agent, or Firm* — Canon U.S.A., Inc. I.P. Division (57) ABSTRACT

An image reading apparatus includes a first stacking unit having a stacking surface, and an abutment portion that abuts a document stacked on the stacking surface, a feeding unit, a reading unit, a second stacking unit, a detection unit, a rotating shaft, a drive unit, and a control unit. The second stacking unit receives the document fed by the feeding unit and read by the reading unit. The detection unit detects presence or absence of the document stacked on the second stacking unit. The drive unit rotates the first stacking unit around the rotating shaft rotatably supporting the first stacking unit. Based on the detection of the absence of the document on the second stacking unit by the detection unit, the control unit controls the drive unit to rotate the first stacking unit in a direction with which the abutment portion is lowered.

17 Claims, 7 Drawing Sheets

(56) References Cited

FOREIGN PATENT DOCUMENTS

| | | | |
|---|---|---|---|
| JP | 2000194234 A | | 7/2000 |
| JP | 2003-323084 A | | 11/2003 |
| JP | 2007230670 A | * | 9/2007 |
| JP | 2007230670 A | | 9/2007 |

* cited by examiner

IMAGE READING APPARATUS AND IMAGE FORMING APPARATUS

BACKGROUND

Field

The present disclosure relates to an image reading apparatus that reads an image of a document, and an image forming apparatus including the image reading apparatus.

Description of the Related Art

An image reading apparatus included in scanners and copying machines is conventionally provided with an automatic document feeder (hereinafter referred to as an ADF) that successively feeds documents stacked on a document tray, conveys each document to an image reading position, reads an image of the document, and discharges the document to a discharge tray. Among the ADFs are configured to align documents in the widthwise direction by a user operation of placing documents on a horizontal document tray and operating a side regulation plate provided on the document tray.

A technique for aligning documents by the documents' own weight with a document tray that is inclined to a front side at a user's document setting operation is known for a document tray for an ADF. Japanese Patent Application Laid-Open No. 2003-323084 discusses a technique for enabling a user to view a document stacking surface of a document tray even from a low viewpoint position for an ADF configured to incline a document tray to the front side. More specifically, when the user having a low viewpoint position changes an inclination angle of an operation panel unit for easier viewing, an inclination angle of the document tray is automatically changed.

In the configuration discussed in Japanese Patent Application Laid-Open No. 2003-323084, the user needs to perform an operation for inclining the operation panel unit to incline the document tray to the front side. Further, when the user holds a document in a hand, the user performs the operation for inclining the document tray to the front side while holding the document in a hand. This adversely affects operability of document setting.

SUMMARY

The present disclosure is directed to improving operability of an image reading apparatus on which documents are set in a state where a document tray is inclined to the front side, and operability of an image forming apparatus including the image reading apparatus.

According to an aspect of the present disclosure, an image reading apparatus includes a first stacking unit having a stacking surface on which a document is to be stacked, and an abutment portion on which an end of the document in a widthwise direction of the document stacked on the stacking surface abuts, a feeding unit configured to feed the document stacked on the first stacking unit in a feeding direction perpendicularly intersecting the document widthwise direction, a reading unit configured to read an image of the document fed by the feeding unit, a second stacking unit configured to receive the document read by the reading unit and discharged to the second stacking unit, a detection unit configured to detect presence or absence of the document on the second stacking unit, a rotating shaft extended in the feeding direction and configured to rotatably support the first stacking unit, a drive unit configured to rotate the first stacking unit around the rotating shaft, and a control unit configured to control the drive unit, wherein, based on the detection of the absence of the document on the second stacking unit by the detection unit, the control unit controls the drive unit to rotate the first stacking unit in a direction with which the abutment portion is lowered.

Further features of the present disclosure will become apparent from the following description of exemplary embodiments with reference to the attached drawings.

DESCRIPTION OF THE EMBODIMENTS

Preferred exemplary embodiments of the present disclosure will be described below with reference to the accompanying drawings.

<Configuration of Image Forming Apparatus 101>

Figure 1:
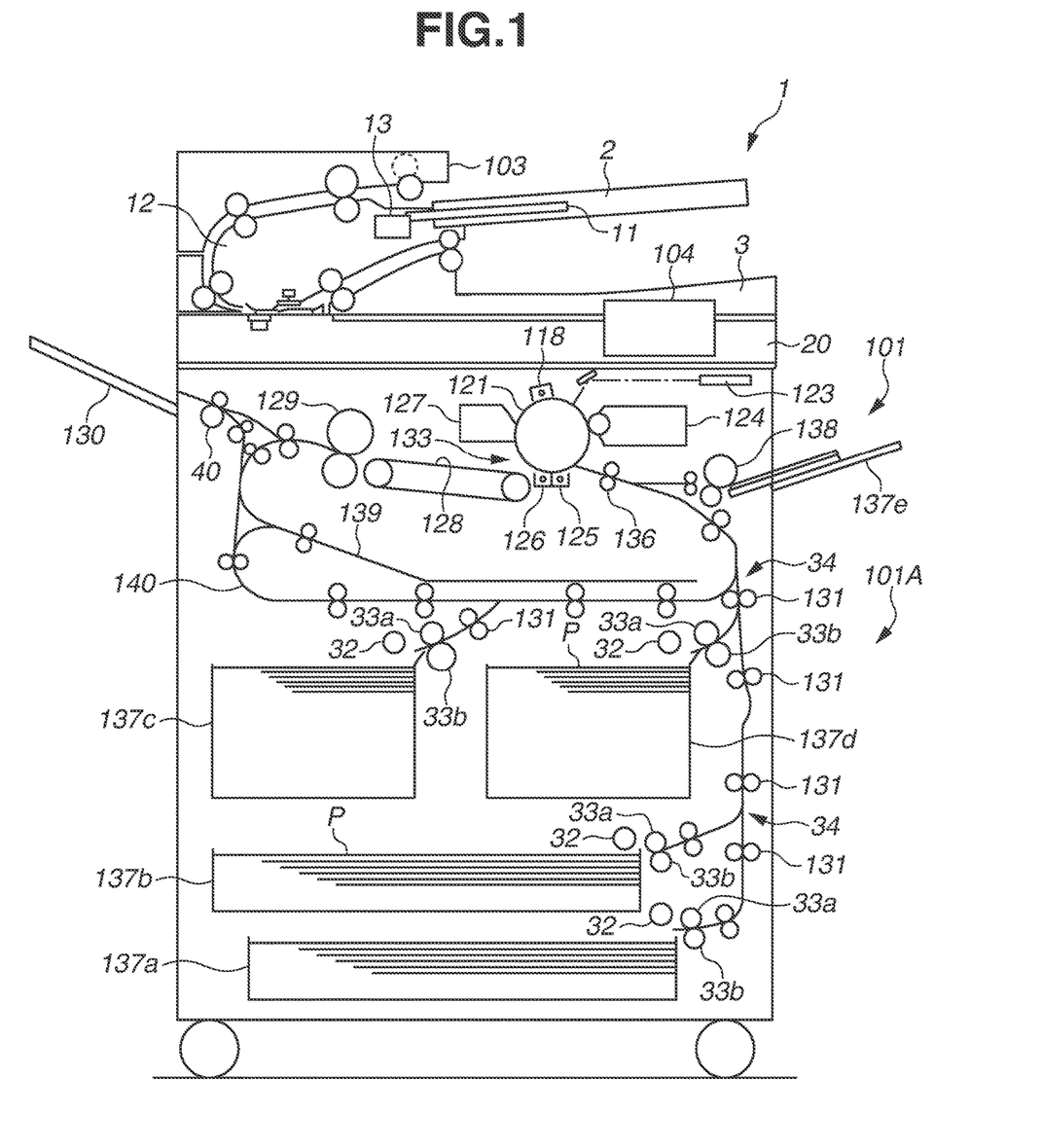
FIG. 1 is a cross-sectional view illustrating an image forming apparatus according to the present exemplary embodiment.

The overall configuration of an image forming apparatus 101 according to the present exemplary embodiment will be described below with reference to FIG. 1. FIG. 1 is a cross-sectional view illustrating the image forming apparatus 101 according to the present exemplary embodiment. In the following descriptions, a position where a user faces an operation unit 104 for performing various input/setting operations on the image forming apparatus 101 is referred to as the "front side" of the image forming apparatus 101, and a rear face side is referred to as the "rear side" of the image forming apparatus 101. More specifically, FIG. 1 illustrates the internal configuration of the image forming apparatus 101 when viewed from the front side.

The image forming apparatus 101 includes an apparatus main body 101A and an image reading apparatus 103, as illustrated in FIG. 1. The image reading apparatus 103 disposed on the top of the apparatus main body 101A includes a reader 20 and an automatic document feeder (hereinafter referred to as an ADF) 1 (described in detail below). The image reading apparatus 103 optically scans a document D to read image information. The document D is paper, such as a print sheet and an envelope, a plastics film, such as an overhead projector (OHP) sheet, and a sheet, such as a cloth. The image information converted into an electrical signal by the image reading apparatus 103 is transferred to a control unit 132 illustrated in FIG. 6 (described below) included in the apparatus main body 101A. The apparatus main body 101A forms an image on a sheet P as a recording material, based on the image read by the image reading apparatus 103.

The apparatus main body 101A includes an image forming unit 133 that forms an image on the sheet P as a recording material, and a sheet feeding unit 34 that feeds the sheet P to the image forming unit 133. The sheet feeding unit 34 includes sheet storage units 137a, 137b, 137c, and 137d capable of storing sheets with different sizes. A sheet stored in the sheet storage units 137a, 137b, 137c, and 137d is picked up by a pickup roller 32, separated from other sheets by a feed roller 33a and a retard roller 33b, and then transferred to a corresponding conveyance roller pair 131. Then, the sheet P is successively transferred to a plurality of conveyance roller pairs 131 disposed along the sheet conveyance path and then conveyed to a registration roller pair 136.

A sheet P placed on a manual feed tray 137e by the user is fed to the inside of the apparatus main body 101A by a feed roller 138 and then conveyed to the registration roller pair 136. The registration roller pair 136 stops a leading edge of the sheet P to correct skew, and restarts conveying the sheet P in synchronization with progress of an image forming operation for a toner image forming process by the image forming unit 133.

The image forming unit 133 that forms an image on the sheet P is an electrophotographic image forming unit including a photosensitive drum 121 as a photosensitive member. The photosensitive drum 121 can rotate along the conveyance direction of the sheet P. A charging device 118, an exposure device 123, a development device 124, a transfer charging device 125, a separation charging device 126, and a cleaner 127 are disposed around the photosensitive drum 121. The charging device 118 uniformly charges the surface of the photosensitive drum 121. The exposure device 123 exposes the photosensitive drum 121 to light, based on image information input from the image reading apparatus 103, to form an electrostatic latent image on the photosensitive drum 121.

The development device 124 including developer containing toner develops the electrostatic latent image into a toner image by supplying charged toner to the photosensitive drum 121. The toner image borne by the photosensitive drum 121 is transferred onto the sheet P conveyed from the registration roller pair 136 by a bias electric field formed by the transfer charging device 125. The sheet P with the toner image transferred thereon is separated from the photosensitive drum 121 by a bias electric field formed by the separation charging device 126, and then conveyed to a fixing unit 129 by a pre-fixing conveyance unit 128. An adhering substance, such as residual toner, on the photosensitive drum 121 (toner untransferred onto the sheet P) is removed by the cleaner 127. Then, the photosensitive drum 121 prepares for the next image forming operation.

The sheet P conveyed to the fixing unit 129 is subjected to fixing processing including pressurization and heating of the toner image, while being held and conveyed by roller pairs. After toner melts and then firmly sticks to the sheet P, the image is fixed to the sheet P. When image output is completed, the sheet P having a fixed image is discharged to a discharge tray 130 that projects to the outside of the apparatus main body 101A, via a discharge roller pair 40. When forming an image on the back surface of the sheet P in double-sided printing, the sheet P that passed through the fixing unit 129 is reversed by a reversing unit 139, and then conveyed to the registration roller pair 136 by a double-sided conveyance unit 140. Then, the sheet P with another image formed thereon again by the image forming unit 133 is discharged to the discharge tray 130.

The above-described image forming unit 133 is an example of an image forming unit. For example, an ink-jet image forming unit or an offset printing mechanism may be used as the image forming unit 133.

<Configuration of Image Reading Apparatus 103>

Figure 2:
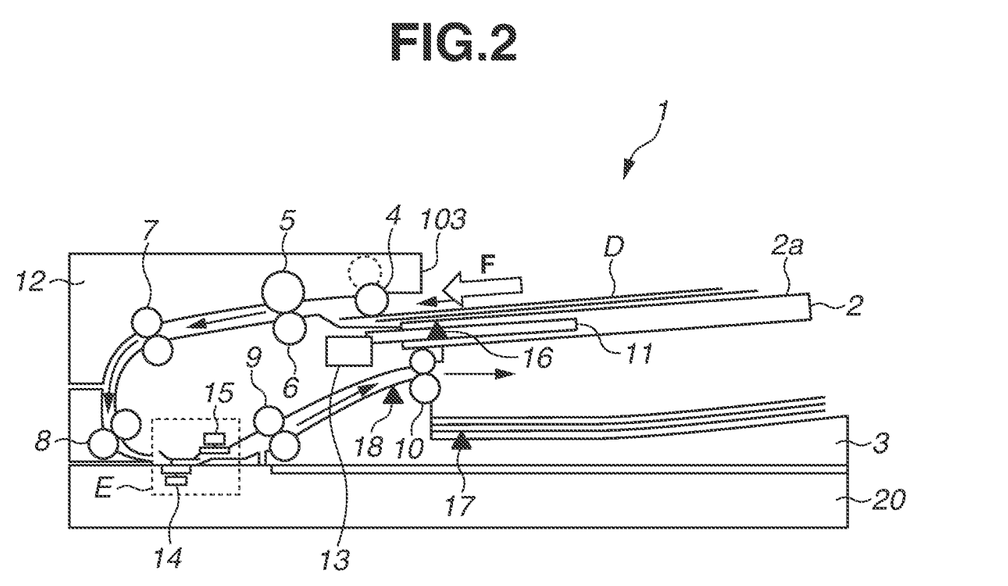
FIG. 2 is a cross-sectional view illustrating an image reading apparatus according to the present exemplary embodiment.

The overall configuration of the image reading apparatus 103 will be described below with reference to FIG. 2. FIG. 2 is a cross-sectional view illustrating the image reading apparatus 103. Sizes, materials, shapes, and relative arrangements of elements described in the following exemplary embodiments are not limited thereto. Unless otherwise specifically described, the scope of the present disclosure is not limited to the exemplary embodiments described below.

As illustrated in FIG. 2, the ADF 1 includes a document tray 2 as a first stacking unit, a conveyance unit 12, and a discharge tray 3 as a second stacking unit. The discharge tray 3 is disposed below the document tray 2. The ADF 1 is attached to be openable and closable to the upper surface of the reader 20. The ADF 1 conveys the document D to a reading position on a document feeding-reading glass disposed on the upper surface of the reader 20. The document D is set to the document tray 2 in the ADF 1. The document tray 2 is supported by a rotating shaft 11 extending along a feeding direction F, to be rotatable with respect to the conveyance unit 12. The rotating shaft 11 is disposed in a vicinity of a widthwise center of the document tray 2. The feeding direction F according to the present exemplary embodiment is a direction in which the document D is fed by a feed roller 4 (described below) and a direction along a document stacking surface 2a at paper feeding. The feeding direction F perpendicularly intersects a widthwise direction of the document tray 2 at paper feeding. The widthwise direction is a main scanning direction of when the image reading apparatus 103 reads an image of the document D.

The document tray 2 is supported by the rotating shaft 11 to be rotatable with respect to the conveyance unit 12. Since the document tray 2 is fixed to the rotating shaft 11, the rotation of the rotating shaft 11 integrally rotates the document tray 2. The document tray 2 is rotated by a driving force from a motor 13 as a drive unit. While, in the present exemplary embodiment, the motor 13 is disposed inside the conveyance unit 12, the arrangement of the motor 13 is not limited thereto. For example, the motor 13 may be disposed inside the document tray 2 or disposed on a side of a drive unit for applying a rotational driving force to each conveyance roller (described below).

As illustrated in FIG. 2, the ADF 1 includes a document detection sensor 16, a discharged document detection sensor 17, and a discharge sensor 18. The document detection sensor 16, the discharged document detection sensor 17, and the discharge sensor 18 are connected to input ports of a central processing unit (CPU) and are used to monitor a behavior of the document D. The document detection sensor 16 is disposed on the document tray 2 to detect presence or absence of the document D on the document tray 2. The discharged document detection sensor 17 as a detection unit is disposed on the discharge tray 3 to detect presence or absence of the document D on the discharge tray 3. The discharge sensor 18 is disposed on an upstream side of a discharge roller pair 10 in a document conveyance path to detect a trailing end of the document D. The discharge sensor 18 is used to detect that the document D has been discharged. When the document detection sensor 16 detects that the document tray 2 has run out of documents D during a feeding operation, a CPU 21 (described below) may determine that the document D fed immediately before the detection is the last document.

As illustrated in FIG. 2, the ADF 1 includes the feed roller 4, a feed roller 5, a separation roller 6, conveyance roller pairs 7, 8, and 9, and the discharge roller pair 10. An image reading section E is disposed on a downstream side of the conveyance roller pair 8 in the conveyance direction. The image reading section E includes a front surface reading unit 14 disposed on the reader 20, and a back surface reading unit 15 disposed on the ADF 1. The document D on the document tray 2 is sent to the feed roller 5 by a rotational driving force of the feed roller 4 as a feeding unit. The document D is separated one by one by the friction between the feed roller 5 and the separation roller 6 urged from below by a spring. The separated document D is sent to the image reading section E by a rotational driving force of the conveyance roller pairs 7 and 8. The document D having been sent to the image reading section E is subjected to image reading on both surfaces by the front surface reading unit 14 and the back surface reading unit 15 as reading units. Then, the document D is conveyed to the discharge roller pair 10 by the conveyance roller pair 9 and discharged to the discharge tray 3 by the discharge roller pair 10. According to the present exemplary embodiment, a series of operations from when the document D set on the document tray 2 is fed by the feed roller 4 until when the document D is discharged to the discharge tray 3 by the discharge roller pair 10 is referred to as a "document reading operation".

<Configuration of Document Tray 2>

Figure 3:
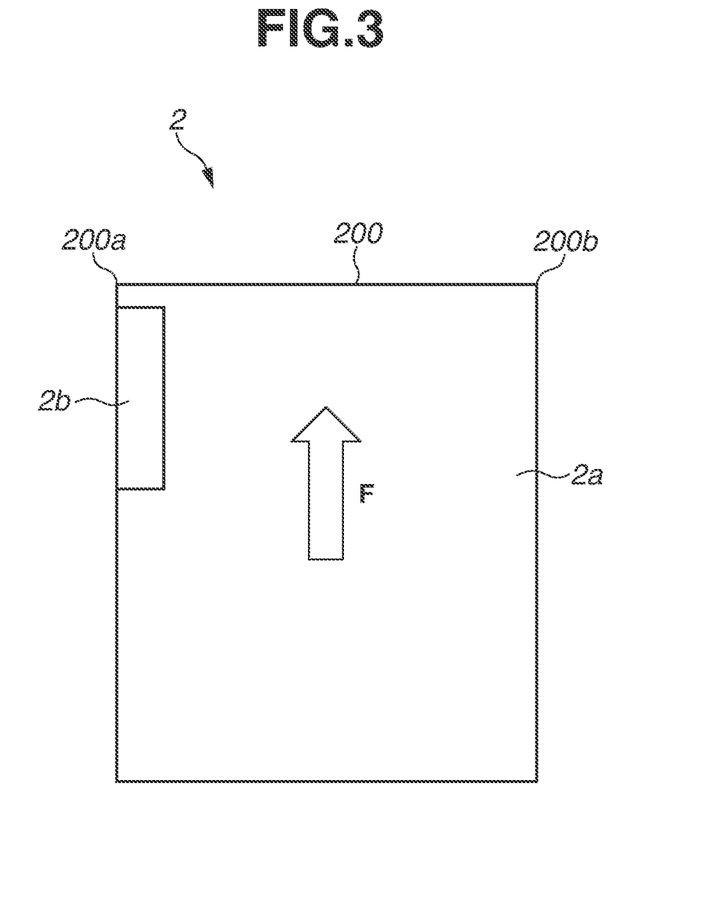
FIG. 3 is a top view illustrating a document tray according to the present exemplary embodiment.
Figure 4:
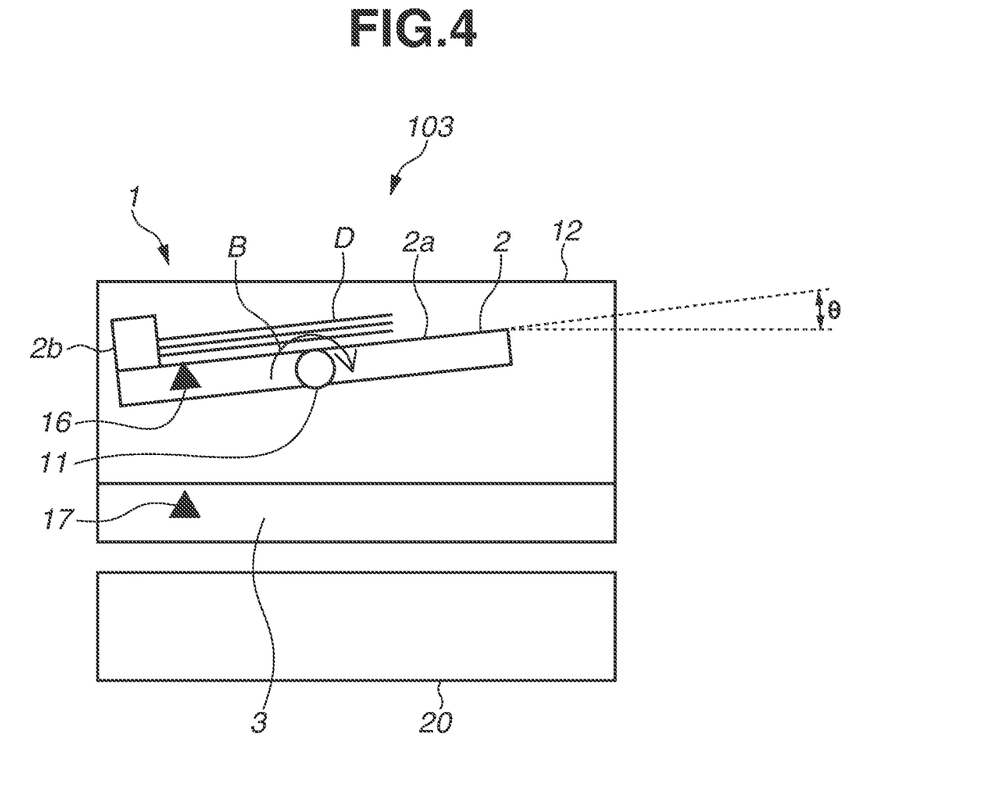
FIG. 4 is a right side view illustrating a state where a document is set in the image reading apparatus according to the present exemplary embodiment.
Figure 5:
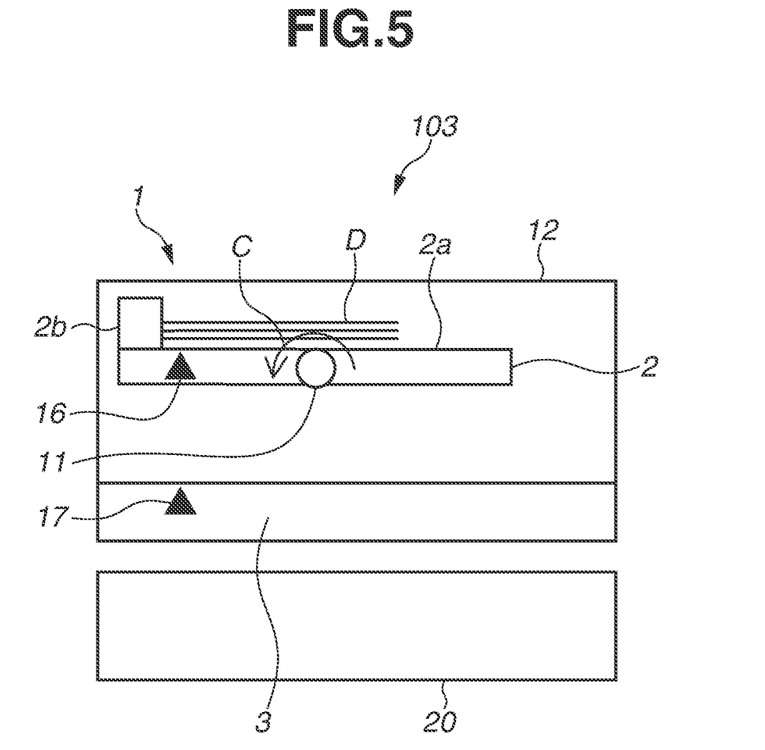
FIG. 5 is a right side view illustrating a state where the document is fed in the image reading apparatus according to the present exemplary embodiment.

The configuration of the document tray 2 will be described below with reference to FIGS. 3, 4, and 5. FIG. 3 is a top view illustrating the document tray 2. FIG. 4 illustrates a state of the document tray 2 when document D is set. FIG. 5 illustrates a state of the document tray 2 when the set document D is fed.

As illustrated in FIG. 3, the document tray 2 includes a document stacking surface 2a and a document abutment portion 2b as a stop member. The document abutment portion 2b is fixed to the document tray 2 on a side of the operation unit 104 (front side). The document stacking surface 2a has a first edge 200a close to the document abutment portion 2b at a downstream end 200 in the feeding direction F, and a second edge 200b on the opposite side of the first edge 200a in the widthwise direction.

The user sets the document D in a state where the document tray 2 is inclined to the front side. In this state, the document tray 2 is in a second state of being inclined to the front side, as illustrated in FIG. 4. When viewed from a direction along the feeding direction F, since the document stacking surface 2a is inclined to the front side by an angle $\theta$ with respect to the horizontal direction, the document D set by the user moves to the front side by its own weight. Since the document abutment portion 2b is disposed on the front side of the document tray 2, one widthwise end of the document D moved by its own weight abuts on the document abutment portion 2b, and thus the documents D are aligned. This enables skipping a conventional action to align the documents D, which has been intentionally performed by the user, making it easier to set the documents D. In a state where the document stacking surface 2a is inclined by the angle $\theta$ with respect to the horizontal direction, the document stacking surface 2a is not smoothly connected with the conveyance path of the conveyance unit 12. More specifically, the downstream end of the document stacking surface 2a in the feeding direction F deviates from an upstream end of a guide that forms the conveyance path of the conveyance unit 12. Thus, the ADF 1 cannot perform a feeding operation in the second state where the document tray 2 is inclined to the front side.

Although the angle $\theta$ is 30 degrees according to the present exemplary embodiment, the angle $\theta$ is not limit thereto but may be $0<\theta<40$. The upper limit of the angle $\theta$, 40 degrees, is the maximum inclination angle at which the set document D abutting on the document abutment portion 2b does not bend. According to the present exemplary embodiment, a length of the document abutment portion 2b in the feeding direction F is set to 150 mm in consideration of the visibility when the document D is set, the present disclosure is not limited thereto.

As described above, the user sets the document D in a state where the document tray 2 is inclined to the front side. However, in a state where the document tray is 2 inclined to the front side, the ADF 1 cannot perform the feeding operation. Thus, after the document D is set, the document tray 2 rotates while the document D is set on the document tray 2, to bring a position of the document abutment portion 2b to be higher than that in the state illustrated in FIG. 4. More specifically, the document tray 2 rotates in a direction (a direction of an arrow B in FIG. 4) with which the first edge 200a on the side of the document abutment portion 2b in the widthwise direction becomes higher than the second edge 200b on the opposite side. After the document tray 2 rotates in the direction of the arrow B in this way, the document tray 2 is in a first state (a state in FIG. 5) where a level of the front side is almost the same as a level of the rear side. Then, the ADF 1 starts a feeding operation for the document D. More specifically, the ADF 1 can perform feeding operation when the document tray 2 is in the first state. In this operation, the document tray 2 starts rotating in response to a user's instruction for starting the document reading operation from the operation unit 104.

According to the present exemplary embodiment, when viewed from the direction along the feeding direction F, the angle $\theta$ of the document stacking surface 2a with respect to the horizontal direction is set to zero degree when the document tray 2 is in the first state. However, it is sufficient that the document stacking surface 2a is smoothly connected with the conveyance path of the conveyance unit 12 at the time of when a feeding operation is started. Thus, when a feeding operation is started, the document stacking surface 2a may be slightly inclined with respect to the horizontal direction within a range where a feeding operation can be performed.

After the last document is subjected to image reading and discharged, and when the user takes out the read document D from the discharge tray 3, the document tray 2 rotates to lower the position of the document abutment portion 2b. More specifically, the document tray 2 rotates in a direction (a direction of an arrow C in FIG. 5) with which the first edge 200a on the side of the document abutment portion 2b in the widthwise direction becomes lower than the second edge 200b on the opposite side. After the document tray 2 rotates in the direction of the arrow C in this way, the document tray 2 is in the second state again where a feeding operation cannot be performed. In a case where the user takes out the document D on the discharge tray 3 before the last document is discharged, the document tray 2 does not rotate and remains in the first state. This means that, when the document D is present on the document tray 2, the document tray 2 does not shift to the second state from the first state even after the document is taken out from the discharge tray 3.

<Control Components of Image Reading Apparatus 103>

Figure 6:
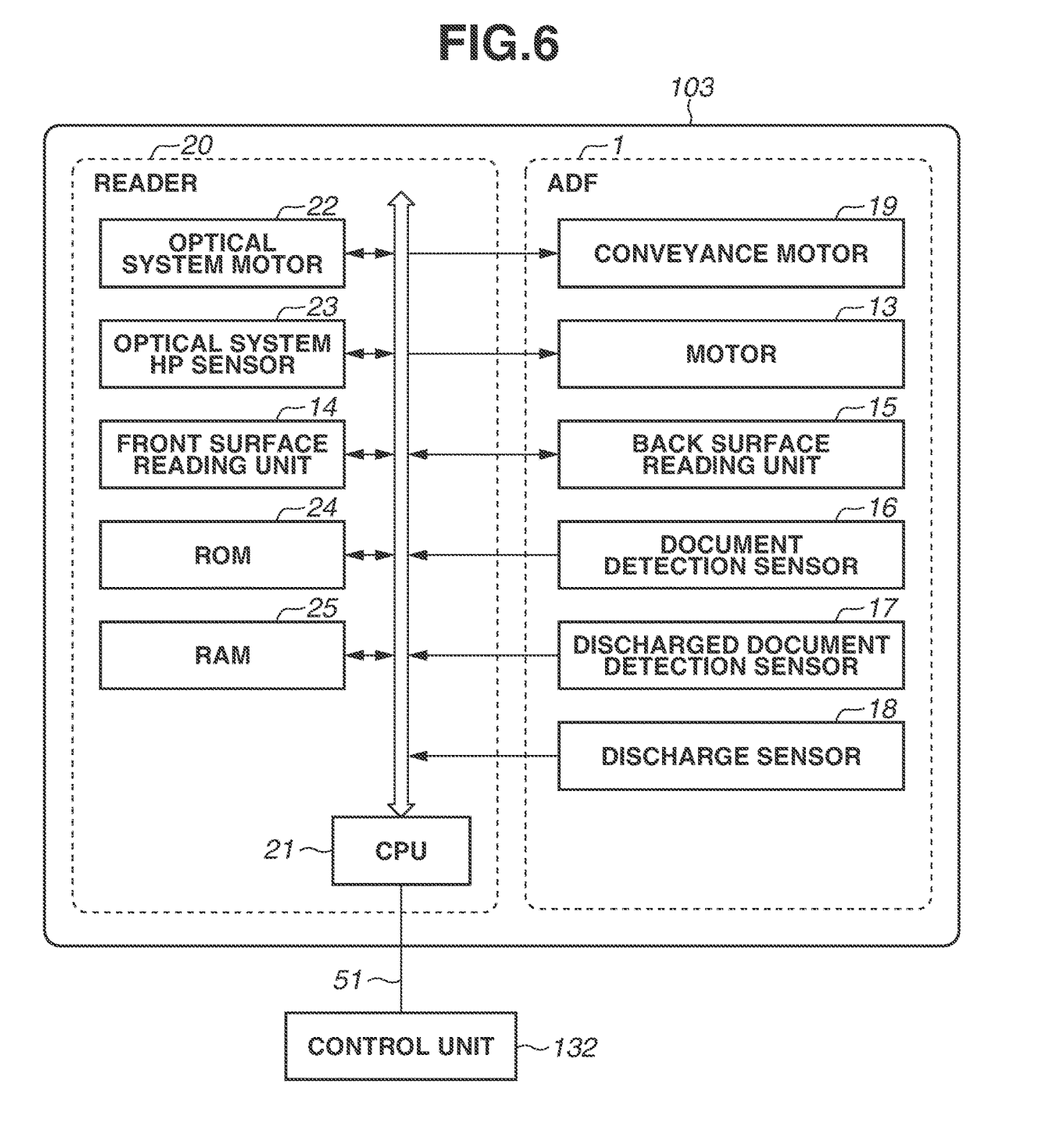
FIG. 6 is a block diagram illustrating control components of the image forming apparatus according to the present exemplary embodiment.

Control components of the image reading apparatus 103 will be described below with reference to FIG. 6. FIG. 6 is a block diagram illustrating control components of the image reading apparatus 103 and the image forming apparatus 101 including the image reading apparatus 103 according to the present exemplary embodiment.

In the image reading apparatus 103, a CPU 21 as the central processing unit executes a program to entirely control each unit of the reader 20 and the ADF 1. A read only memory (ROM) 24 is a storage device for storing control details to be executed by the CPU 21 as a program and data to be used for program execution. A random access memory (RAM) 25 is a storage device that is used as a work area for the CPU 21 to perform control.

To implement the document conveyance function, a conveyance motor 19 as a drive source for driving each conveyance roller disposed in the ADF 1 is connected to the CPU 21, and a motor 13 as a drive source for rotating the document tray 2 is also connected to the CPU 21. The CPU 21 controls driving of the conveyance motor 19 and the motor 13. The document detection sensor 16, the discharged document detection sensor 17, and the discharge sensor 18 are also connected to the CPU 21. The CPU 21 receives signals from these sensors and controls each unit, based on the received signals.

An optical system motor 22 and an optical system HP sensor 23 to move the front surface reading unit 14 in a sub scanning direction is connected to the CPU 21. The optical system HP sensor 23 detects a position of the front surface reading unit 14 in a movement direction of the front surface reading unit 14 by the optical system motor 22. The front surface reading unit 14 and the back surface reading unit 15 are image sensor units for scanning an image of the document D to perform image reading on a line basis.

The control unit 132 is an information processing apparatus that entirely controls the image forming apparatus 101 as an image reading system including the reader 20 and the ADF 1. The CPU 21 exchanges control commands and control data for image reading control via the control unit 132 and a communication line 51. For example, the control unit 132 receives an instruction for starting an image reading operation by the user from the operation unit 104 and transmits a request for starting image reading to the CPU 21.

The CPU 21 can measure an elapsed time t from when a document reading operation ends. The CPU 21 further determines whether the elapsed time t from when a document reading operation ends is equal to or longer than a predetermined time T (60 seconds according to the present exemplary embodiment). When the elapsed time t from when the document reading operation ends becomes equal to or longer than the predetermined time T, the CPU 21 drives the motor 13 to incline the document tray 2 to the front side. Thus, in a case where the user forgets to take out the discharged document D, the document tray 2 shifts to the state of being inclined to the front side when the predetermined time T has elapsed from when the document reading operation ends.

<Document Reading Processing Procedure>

Figure 7:
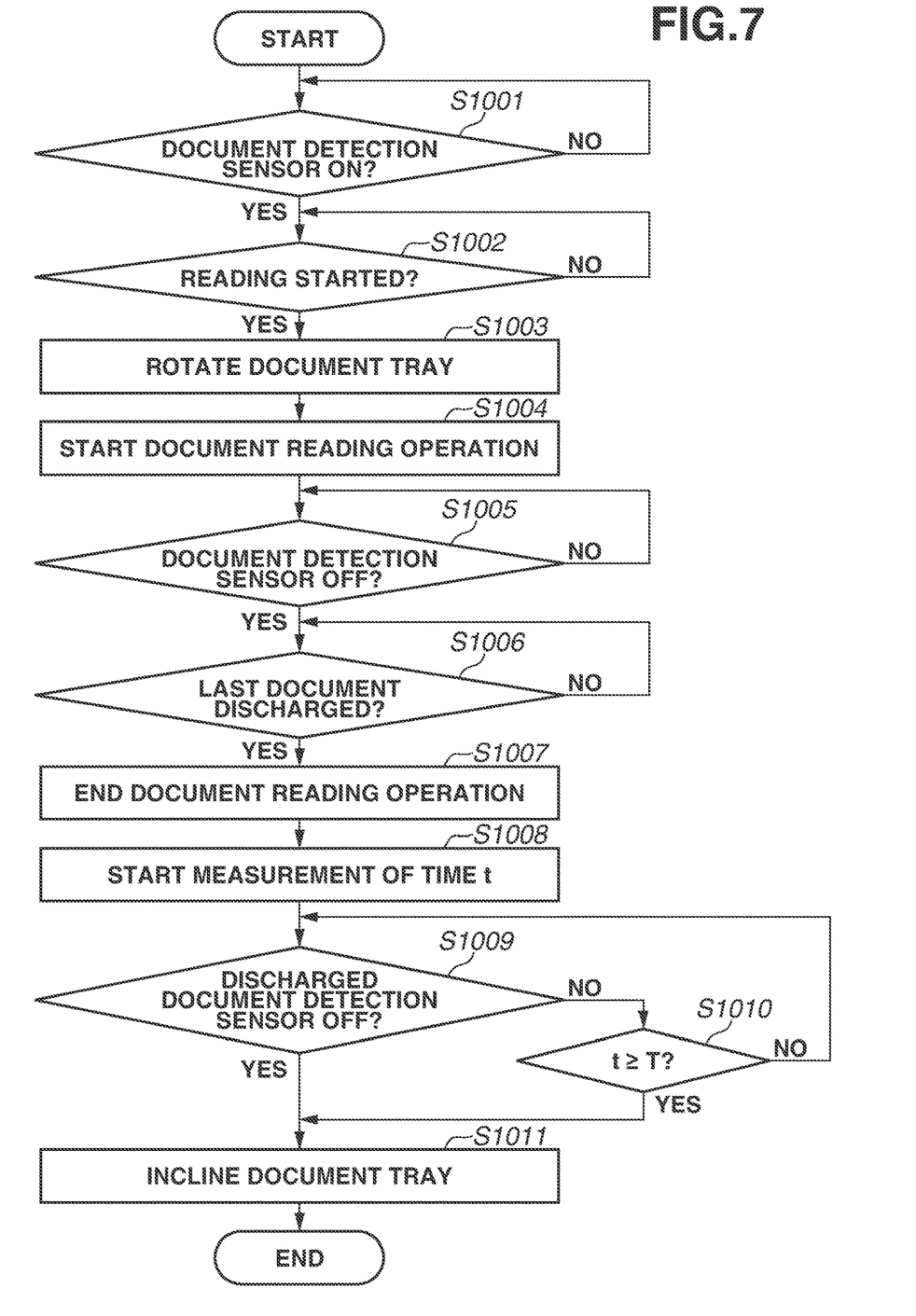
FIG. 7 is a flowchart illustrating a document reading operation according to the present exemplary embodiment.

A processing procedure for reading an image of the document D will be described below with reference to FIG. 7. FIG. 7 is a flowchart illustrating a processing procedure for reading an image of the document D stacked on the document tray 2. Processing of this flowcharts is executed by the CPU 21.

In a case where the CPU 21 as the control unit receives a signal generated when the user sets the document D on the document tray 2, from the document detection sensor 16 (YES in step S1001), the processing proceeds to step S1002. In this operation, the document tray 2 is in the second state of being inclined to the front side.

In a case where the control unit 132 receives an instruction for starting a document reading operation by the user (YES in step S1002), the processing proceeds to step S1003. In step S1003, the CPU 21 drives the motor 13. The driving force from the motor 13 rotates the document tray 2 in the direction of the arrow B in FIG. 4. Thus, the document tray 2 shifts from the second state where the feeding operation cannot be performed to the first state where the feeding operation can be performed.

When the document tray 2 shifts to the state where the feeding operation can be performed in step S1003, the processing proceeds to step S1004. In step S1004, the CPU 21 starts a document reading operation. When the CPU 21 starts the document reading operation, the image reading apparatus 103 conveys the document D stacked on the document tray 2 with the above-described rollers and reads an image of the document D.

In a case where the CPU 21 receives a signal indicating that the document tray 2 has fed the last document and run out of documents D, from the document detection sensor 16 (YES in step S1005), the processing proceeds to step S1006. Meanwhile, in a case where there is an unread document D on the document tray 2 (NO in step S1005), the CPU 21 repeats or performs the feeding operation for the document D until the CPU 21 receives a signal indicating that the document tray 2 has run out of documents D, from the document detection sensor 16.

In a case where the CPU 21 receives a signal indicating that the last document has been discharged, from the discharge sensor 18 (YES in step S1006), the processing proceeds to step S1007. In step S1007, the CPU 21 ends the document reading operation. In step S1008, the CPU 21 starts measuring the elapsed time t from when the document reading operation ends.

In a case where the CPU 21 receives a signal indicating that the discharged document D has been taken out from the discharge tray 3 by the user, from the discharged document detection sensor 17 (YES in step S1009), the processing proceeds to step S1011. The signal indicating that the document D has been taken out from the discharge tray 3 by the user means that the signal output from the discharged document detection sensor 17 to the CPU 21 has changed from a signal indicating presence of documents D to a signal indicating absence of documents D. In step S1011, the CPU 21 drives the motor 13. The driving force from the motor 13 rotates the document tray 2 in the direction of the arrow C to shift the document tray 2 to the state where the document tray 2 is inclined to the front side. Thus, the document tray 2 changes from the first state where the feeding operation can be performed to the second state where the feeding operation cannot be performed. Then, the CPU 21 ends the processing of this flowchart.

Meanwhile, in a case where the user forgets to take out the discharged document D from the discharge tray 3 (NO in step S1009), the processing proceeds to step S1010. In step S1010, the CPU 21 determines whether the elapsed time t from when the document reading operation ends is equal to or longer than the predetermined time T (60 seconds according to the present exemplary embodiment). In a case where the CPU 21 determines that the elapsed time t from when the document reading operation ends is equal to or longer than the predetermined T (YES in step S1010), the processing proceeds to step S1011. On the other hand, in a case where the CPU 21 determines that the elapsed time t from when the document reading operation ends is shorter than the predetermined T (NO in step S1010), the processing returns to step S1009. While the predetermined time T is 60 seconds in the present exemplary embodiment, the value is not limited thereto.

According to the present exemplary embodiment, as described above, based on the determination that the document D having been subjected to image reading is taken out from the discharge tray 3, the document tray 2 rotates to shift from the first state where the feeding operation can be performed to the second state of being inclined to the front side. This enables skipping an operation for inclining the document tray 2 when the next document D is set. Even in a case where the user holds the document D to be subjected to image reading in a hand, the user can set the document D to the document tray 2 before operating the image reading apparatus 103.

Further, according to the present exemplary embodiment, the user can easily take out the document D from the discharge tray 3. This is because the document tray 2 maintains the state illustrated in FIG. 5 until the document D is removed from the discharge tray 3. More specifically, since the document tray 2 is disposed above the discharge tray 3, the document tray 2 disturbs the user's action to take out the document D from the discharge tray 3 if the document tray 2 shifts to the state of being inclined to the front side illustrated in FIG. 4 before the document D is removed from the discharge tray 3. On the other hand, according to the present exemplary embodiment, the document tray 2 is in a state where the position of the document abutment portion 2*b* is raised until the user takes out the document D from the discharge tray 3. This makes it easier for the user to take out the document D from the discharge tray 3.

The present exemplary embodiment has been described above centering on an example case where, based on absence of documents D on the discharge tray 3 (second stacking unit), the document tray 2 shifts from the first state where the feeding operation can be performed to the second state of being inclined to the front side. Alternatively, when the user takes out the document D from the discharge tray 3, the document tray 2 may be inclined to the rear side. In this case, based on absence of documents D on the discharge tray 3, the document tray 2 shifts from the state of being inclined to the rear side to the state of being inclined to the front side.

According to the configuration of the present disclosure, a document tray rotates based on detection of absence of a discharged document by a detection unit, whereby an image reading apparatus having high operability can be provided.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-095457, filed Jun. 1, 2020, which is hereby incorporated by reference herein in its entirety.

What is claimed is:

1. An image reading apparatus comprising:
a first stacking unit having a stacking surface on which a document is to be stacked, and an abutment portion on which an end of the document in a widthwise direction of the document stacked on the stacking surface abuts;
a feeding unit configured to feed the document stacked on the first stacking unit in a feeding direction perpendicularly intersecting the document widthwise direction;
a reading unit configured to read an image of the document fed by the feeding unit;
a second stacking unit configured to receive the document read by the reading unit and discharged to the second stacking unit;
a detection unit configured to detect presence or absence of the document on the second stacking unit;
a rotating shaft extended in the feeding direction and configured to rotatably support the first stacking unit;
a drive unit configured to rotate the first stacking unit around the rotating shaft; and
a control unit configured to control the drive unit,
wherein, based on the detection of the absence of the document on the second stacking unit by the detection unit, the control unit controls the drive unit to rotate the first stacking unit in a direction with which the abutment portion is lowered.

2. The image reading apparatus according to claim 1, further comprising a second detection unit configured to detect presence or absence of a document on the first stacking unit,
wherein, in a case where the second detection unit detects the document on the first stacking unit, the control unit does not control the drive unit even in a case where the detection unit detects absence of the document on the second stacking unit.

3. The image reading apparatus according to claim 1,
wherein, in a case where the drive unit rotates the first stacking unit around the rotating shaft, the first stacking unit is shifted from a first state where a feeding operation can be performed by the feeding unit to a second state where a position of the abutment portion is lower than the position of the abutment portion in the first state and the feeding operation cannot be performed by the feeding unit, and wherein the control unit is configured to control to the drive unit to shift the first stacking unit from the first state to the second state.

4. The image reading apparatus according to claim 1, wherein, after elapse of a predetermined time from when a document reading operation ends, the control unit controls the drive unit regardless of presence or absence of the document on the second stacking unit.

5. The image reading apparatus according to claim 1, further comprising an operation unit configured to accept a reading start instruction,
wherein the abutment portion is disposed on an operation unit side of the first stacking unit.

6. The image reading apparatus according to claim 5, wherein, based on the acceptance of the reading start instruction by the operation unit, the control unit controls the drive unit to rotate the first stacking unit in a direction with which the abutment portion is raised.

7. The image reading apparatus according to claim 1, wherein the abutment portion is fixed to the first stacking unit.

8. The image reading apparatus according to claim 1, wherein the second stacking unit is disposed below the first stacking unit.

9. The image reading apparatus according to claim 1, further comprising a conveyance unit including a plurality of conveyance rollers for conveying the document fed by the feeding unit to a reading position,
wherein the first stacking unit is disposed to be rotatable with respect to the conveyance unit.

10. An image reading apparatus comprising:
a first stacking unit having a stacking surface on which a document is to be stacked, and an abutment portion on which an end of the document in a widthwise direction of the document stacked on the stacking surface abuts;
a feeding unit configured to feed the document stacked on the first stacking unit in a feeding direction perpendicularly intersecting the document widthwise direction;
a reading unit configured to read an image of the document fed by the feeding unit;
a second stacking unit configured to receive the document read by the reading unit and discharged;
a detection unit configured to detect presence or absence of the document on the second stacking unit;
a rotating shaft extended in the feeding direction and configured to rotatably support the first stacking unit;
a drive unit configured to rotate the first stacking unit around the rotating shaft; and
a control unit configured to control the drive unit,
wherein, at a downstream end in the feeding direction, the stacking surface has a first edge and a second edge, where the first edge is close to the abutment portion in the document widthwise direction and the second edge is distant from the abutment portion in the document widthwise direction in comparison with the first edge, and
wherein, based on the detection of the absence of the document on the second stacking unit by the detection unit, the control unit controls the drive unit to rotate the first stacking unit in a direction with which the first edge becomes lower than the second edge.

11. The image reading apparatus according to claim 10, further comprising an operation unit configured to accept a reading start instruction,
wherein the abutment portion is disposed on an operation unit side of the first stacking unit.

12. The image reading apparatus according to claim 11, wherein, based on the acceptance of the reading start instruction by the operation unit, the control unit controls the drive unit to rotate the first stacking unit in a direction with which the first edge becomes higher than the second edge.

13. The image reading apparatus according to claim 10, wherein the second stacking unit is disposed below the first stacking unit.

14. The image reading apparatus according to claim 10, further comprising a conveyance unit including a plurality of conveyance rollers for conveying the document fed by the feeding unit to a reading position,
wherein the first stacking unit is disposed to be rotatable with respect to the conveyance unit.

15. An image forming apparatus comprising:
a first stacking unit having a stacking surface on which a document is to be stacked, and an abutment portion on which an end of the document in a widthwise direction of the document stacked on the stacking surface abuts;
a feeding unit configured to feed the document stacked on the first stacking unit in a feeding direction perpendicularly intersecting the document widthwise direction;
a reading unit configured to read an image of the document fed by the feeding unit;
a second stacking unit configured to receive the document read by the reading unit and discharged to the second stacking unit;
a detection unit configured to detect presence or absence of the document on the second stacking unit;
a rotating shaft extended in the feeding direction and configured to rotatably support the first stacking unit;
a drive unit configured to rotate the first stacking unit around the rotating shaft;
a control unit configured to control the drive unit, and
an image forming unit configured to form an image on a recording material based on the image read by the reading unit,
wherein, based on the detection of the absence of the document on the second stacking unit by the detection unit, the control unit controls the drive unit to rotate the first stacking unit in a direction with which the abutment portion is lowered.

16. A method for an image reading apparatus that includes a first stacking unit having a stacking surface on which a document is to be stacked, and an abutment portion on which an end of the document in a widthwise direction of the document stacked on the stacking surface abuts, and having a second stacking unit and a rotating shaft extended in a feeding direction, the method comprising:
feeding the document stacked on the first stacking unit in the feeding direction perpendicularly intersecting the document widthwise direction;
reading an image of the fed document;
receiving, on the second stacking unit, the read document discharged to the second stacking unit;
detecting presence or absence of the document on the second stacking unit;
rotatably supporting the first stacking unit by the rotating shaft;
rotating the first stacking unit around the rotating shaft; and
controlling the rotating of the first stacking unit around the rotating shaft,
wherein, based on the detection of the absence of the document on the second stacking unit, controlling includes rotating the first stacking unit in a direction with which the abutment portion is lowered.

17. A non-transitory computer-readable storage medium storing a program to cause a computer to perform a method for an image reading apparatus that includes a first stacking unit having a stacking surface on which a document is to be stacked, and an abutment portion on which an end of the document in a widthwise direction of the document stacked on the stacking surface abuts, and having a second stacking unit and a rotating shaft extended in a feeding direction, the method comprising:

- feeding the document stacked on the first stacking unit in the feeding direction perpendicularly intersecting the document widthwise direction;
- reading an image of the fed document;
- receiving, on the second stacking unit, the read document discharged to the second stacking unit;
- detecting presence or absence of the document on the second stacking unit;
- rotatably supporting the first stacking unit by the rotating shaft;
- rotating the first stacking unit around the rotating shaft; and
- controlling the rotating of the first stacking unit around the rotating shaft,
- wherein, based on the detection of the absence of the document on the second stacking unit, controlling includes rotating the first stacking unit in a direction with which the abutment portion is lowered.

\* \* \* \* \*